(12) United States Patent
Tussy (10) Patent No.: US 9,442,522 B2
(45) Date of Patent: Sep. 13, 2016

(54) ACCESSORY FOR WEARABLE COMPUTER

(71) Applicant: Kevin Alan Tussy, Las Vegas, NV (US)

(72) Inventor: Kevin Alan Tussy, Las Vegas, NV (US)

(*) Notice: Subject to any disclaimer, the term of this patent is extended or adjusted under 35 U.S.C. 154(b) by 8 days.

(21) Appl. No.: 14/329,841

(22) Filed: Jul. 11, 2014

(65) Prior Publication Data

US 2015/0016035 A1 Jan. 15, 2015

Related U.S. Application Data

(60) Provisional application No. 61/845,264, filed on Jul. 11, 2013, provisional application No. 61/861,328, filed on Aug. 1, 2013.

(51) Int. Cl.
*G06F 1/16* (2006.01)
*G06F 1/18* (2006.01)

(52) U.S. Cl.
CPC .......... *G06F 1/163* (2013.01); *G06F 1/1632* (2013.01); *G06F 1/1635* (2013.01); *G06F 1/189* (2013.01)

(58) Field of Classification Search
CPC ...... G06F 1/163; G06F 1/189; G06F 1/1632; G06F 1/1635; H05K 1/0254; H05K 1/028; H05K 1/0298; H05K 1/092; H05K 1/115; H05K 2201/10128
USPC ............. 361/679.03, 679.02, 679.4; 351/158
See application file for complete search history.

(56) References Cited

U.S. PATENT DOCUMENTS

| D688,727 S | 8/2013 | Olsson | |
|---|---|---|---|
| 8,848,940 B2* | 9/2014 | Tricoukes | G06F 1/163 345/8 |
| 8,968,012 B2* | 3/2015 | Olsson | H01R 13/562 439/131 |
| 2002/0145501 A1* | 10/2002 | Zayatz | H01M 2/34 337/295 |
| 2010/0308086 A1* | 12/2010 | Chapuis | A45F 3/04 224/148.2 |
| 2012/0268058 A1* | 10/2012 | Enoki | B60R 16/033 320/104 |

* cited by examiner

*Primary Examiner* — Anthony Haughton
*Assistant Examiner* — Ingrid Wright
(74) *Attorney, Agent, or Firm* — Weide & Miller, Ltd.

(57) ABSTRACT

An accessory for a wearable computer includes a strap having a cover that covers a plurality of batteries; a first connector that joins a first end of the strap to a first end of the wearable computer; a second connector that joins a second end of the strap to a second end of the wearable computer, the second connector having a housing, and an electrical coupling; and an electronic control unit disposed within the housing, the electronic control unit being electrically connected to the plurality of batteries and being electrically connected to the electrical coupling. The electrical coupling is configured to be electrically connected to the wearable computer, and the batteries supply power to the wearable computer via the electronic control unit and the electrical coupling.

18 Claims, 8 Drawing Sheets

FIG. 6

ACCESSORY FOR WEARABLE COMPUTER

PRIORITY CLAIM

The present application claims priority to and the benefit of U.S. Provisional Application No. 61/845,264 filed on Jul. 11, 2013, the entire contents of which are hereby incorporated by reference and to U.S. Provisional Application No. 61/861,328 filed on Aug. 1, 2013, the entire contents of which are hereby incorporated by reference.

FIELD OF THE INVENTION

The invention relates to batteries packs and in particular to a flexible power source for a wearable computer.

BACKGROUND

The disclosed embodiments relate to an accessory for a wearable computer. More specifically, the disclosed embodiments relate to an accessory that operates as a supplemental power storage for a wearable computer.

The use of mobile computers has become commonplace. Such mobile computers are now being configured to be wearable on a user. For example, a mobile computing device may be wearable as a pair of glasses or as a wrist watch.

While the concept of having a computer, electronic device or computing device which is worn is appealing, actually using the wearable device presents numerous challenges. Once such challenge is that wearable computing devices are typically battery powered and thus suffer from having a short battery life. This limits the functionality of the wearable computing device because the device can be used only periodically, or runs out of power after only a short time of continual use.

One proposal is to simply increase the size of the battery in the device, but this adds weight to the wearable computing device, which in turn may make the device unusably large and heavy, such that it may no longer be wearable. This will discourage use of the computing device and takes away from the benefits of the device.

To overcome these drawbacks and provide additional benefits, an accessory for a wearable computer is disclosed.

SUMMARY

Mobile computers, including wearable mobile computers, typically rely on batteries to provide the electrical power necessary for their operation. Such batteries may be rechargeable batteries that a user recharges by plugging the mobile computer into an external power supply, such as an electrical outlet, or by way of inductive charging.

Specifically concerning wearable computing devices, it may become difficult to provide batteries that have sufficient capacity to power the wearable computer for a desired amount of time while still being small enough in size to be comfortably integrated into the wearable computer.

Therefore, there is a need to provide an ability to extend the battery life of a wearable computer without degrading comfort. The disclosed embodiments have been created in light of the above described problems.

Therefore, disclosed herein is an accessory for a wearable computer which includes a strap having a cover that covers a plurality of batteries; a first connector that joins a first end of the strap to a first end of the wearable computer; a second connector that joins a second end of the strap to a second end of the wearable computer, the second connector having a housing, and an electrical coupling; and an ECU disposed within the housing, the ECU being electrically connected to the plurality of batteries and being electrically connected to the electrical coupling. The electrical coupling is configured to be electrically connected to the wearable computer, and the batteries supply power to the wearable computer via the ECU and the electrical coupling.

Various embodiments of the present invention are disclosed herein. In one embodiment, accessory for a wearable computer is disclosed having a flexible strap having an inner volume such that the flexible strap has a first strap end and a second strap end. Also part of this embodiment are one or more batteries that are electrically connected and contained within the inner volume of the flexible strap. A first connector attaches to the first strap end and has a first wearable computer connector. The first wearable computer connector is configured to releasably connect to a wearable computer. A second connector attaches to the second strap end. The second connector includes a second wearable computer connector configured to releasably connect to a wearable computer, a housing formed as part of the second connector and the second wearable computer connector, and an electronic control unit contained within the housing. The electronic control unit in electrical communication with the one or more batteries and having one or more ports configured to electrically connect to a wearable computer to provide power to the wearable computer and electrically connect to an external power source for charging of the one or more batteries.

In one embodiment the wearable computer is implemented on glasses frame which is supported by a user's face and the first and second connectors connect the first and second ends of the strap to temples of the frame of the glasses. It is also contemplated that the first connector and the second connector each include an extending portion that connects to the first end of the strap and second end of the strap, respectively, such that the extending portions extend obliquely with respect to an axis defined by the temples of the pair of glasses, such that an angle, on the nose piece side of the frame, formed by temples of the frame and the extending portion is greater than ninety degrees. In one embodiment, the first and second connectors are configured to receive ends of the temples such that when the first and second connectors are connected to the temples, relative movement between the first and second connectors and the temples is inhibited.

Also contemplated as being part of this embodiment is wiring configured to electrically connect each of the plurality of batteries an adjacent battery such that the wiring is flexible so as to allow relative angular movement between adjacent batteries to enable flexability of the strap. Flexible shrink wrap may surround the plurality of batteries and wiring.

The strap may be made from woven Kevlar fibers, neoprene, rubber, cotton fabric, or any other material. The strap may releasably connect to the first and second connectors to allow replacement of the strap or batteries. In one configuration, the second connector includes a charging port that is electrically connected to the electronic control unit such that the charging port is configured to receive electrical power from an external power supply. In addition, the electronic control unit may be configured as a charge controller that controls an amount of electrical power supplied from the external power supply to charge the one or more batteries. In one embodiment the electronic control unit further comprise a temperature sensor and an overcharge detection unit, and the electronic control unit is configured to terminate charging of the batteries when the overcharge detection unit detects an overcharge or when the temperature sensor detects a temperature that exceeds a predetermined temperature.

In one embodiment, an accessory for a wearable computing device is disclosed that includes the following elements. One or more batteries electrically connected to form a power source such that the power source is configured to electrically connect to a wearable computing device. One or more covers covering the one or more batteries, such that the one or more batteries covered by the one or more covers are flexible. One or more connectors physically attached to the strap and further configured to physically and realeasable attach to the wearable computing device. Also part of this embodiment is an electrical connector configured to electrically connect the power source to the wearable computing device.

In one configuration, this embodiment further comprising an electronic control unit having a charging port, the electronic control unit electrically connected to the power source formed by the one or more batteries. In one embodiment, the wearable computing device for use with the accessory is a data transceiver with a projection device mounted to a glasses frame. In one configuration the one or more straps are made of one strap having a length that when worn by a user, extends across the back of the user's neck and extends downward to a position between the users between a bottom of the user's earlobes and a top of a shoulders of the user. It is contemplated that the one or more batteries may comprise three lithium ion batteries electrically connected with wires and the one or more covers comprises an inner cover and an outer cover. The batteries may be configured with graphene. The one or more connectors may releasably attach to the one or more straps to allow replacement of the one or more straps.

Also disclosed is a method of powering a wearable computer with an accessory for a wearable computer. In one embodiment the method includes providing a strap that includes a cover having one or more of batteries within the strap. The user may join a first end of the strap to a first end of the wearable computer via a first connector and then join a second end of the strap to a second end of the wearable computer via a second connector. The user then electrically connects the one or more batteries to the wearable computer via an electrical connection, and wears the wearable computer while supplying electric power to the wearable computer from the one or more batteries when wearing of the wearable computer.

The wearable computer may be a glasses frame with an image display device. The method may further comprise charging the one or more batteries and one or more batteries inside the wearable computer by connecting a plug-in wall charger to a charging part associated with a charge controller that is in electrical communication with one or more batteries.

Further objects, features, and advantages of the present invention over the prior art will become apparent from the detailed description which follows, when considered with the attached figures.

DETAILED DESCRIPTION OF EMBODIMENTS

In the following description, numerous specific details are set forth in order to provide a more thorough description of the disclosed embodiments. It will be apparent, however, to one skilled in the art, that the present invention may be practiced without these specific details. In other instances, well-known features have not been described in detail so as not to obscure the invention.

Figure 1:
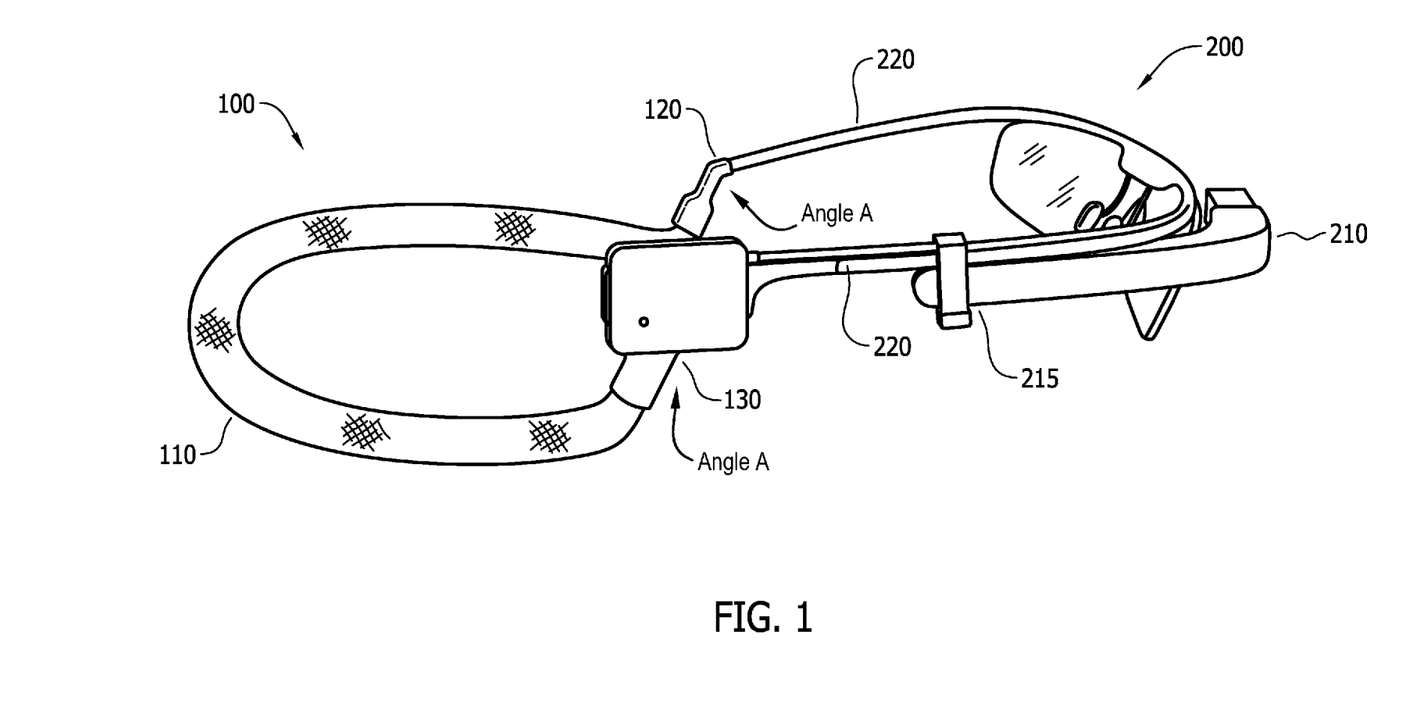
FIG. 1 shows an exemplary embodiment of an accessory for a wearable computer integrated with the wearable computer.

FIG. 1 shows an accessory 100 for a wearable computer 200. The wearable computer 200 in this embodiment is implemented as a pair of glasses. An example of such a wearable computer 200 is known under the trade name GOOGLE GLASS. The wearable computer 200 includes a computer 210 that is mounted to a pair of glasses. For example the computer 210 may be mounted to one of the temples 220 (ear pieces) of the glasses and may display information to the user by projecting a display onto the glasses. The computer 210 includes a port 215 that is connectable to a power source to power the computer 210 and to recharge the computer's 210 power storage device such as a battery. The term computer is defined herein to mean any device or system capable of performing processing, receiving input from the user or environment or presenting information to the user.

In the embodiment, the accessory 100 is configured to be removably connected to each of the temples 220 of the glasses of the wearable computer 200 via a first connector 120 and a second connector 130. The accessory 100 further includes a strap 110 that extends from the first connector 120 to the second connector 130. When the accessory 100 is connected to the temples 220 of the wearable computer 200, the strap 110 of the accessory 100 is configured to extend around the back of a user's head and/or neck.

Figure 4A:
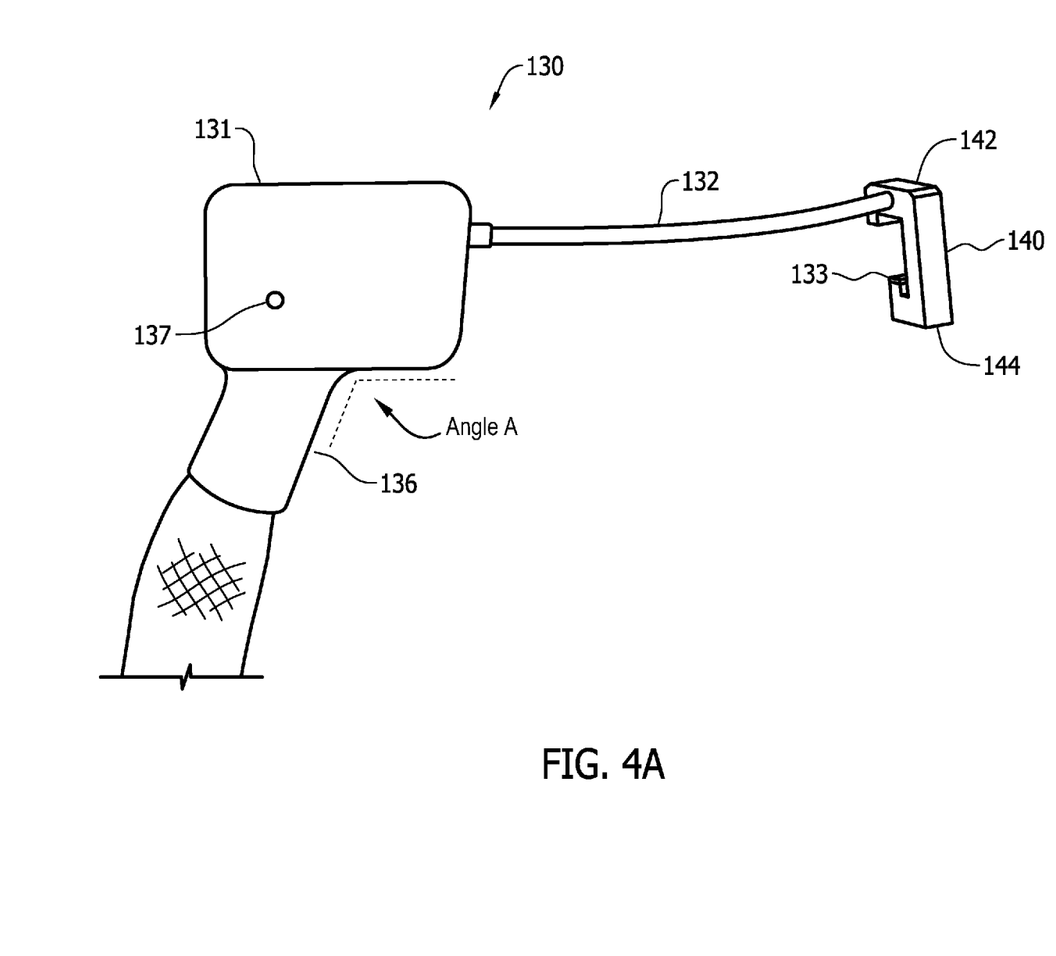
FIG. 4A shows a close up view from a first perspective of a second connector of the accessory for a wearable computer according to an exemplary embodiment.

An Angle A shown in FIG. 1 that is formed by the temple piece 220 and the connector 130, 120 is in some embodiments greater than 90 degrees to thereby angle the part of the connector that connects to the strap 110 at an angle backward and downward. This angle is also shown in FIG. 4A. Use of an angle A increases comfort and wearability an locates the weight of the strap along the user's neck.

Figure 2A:
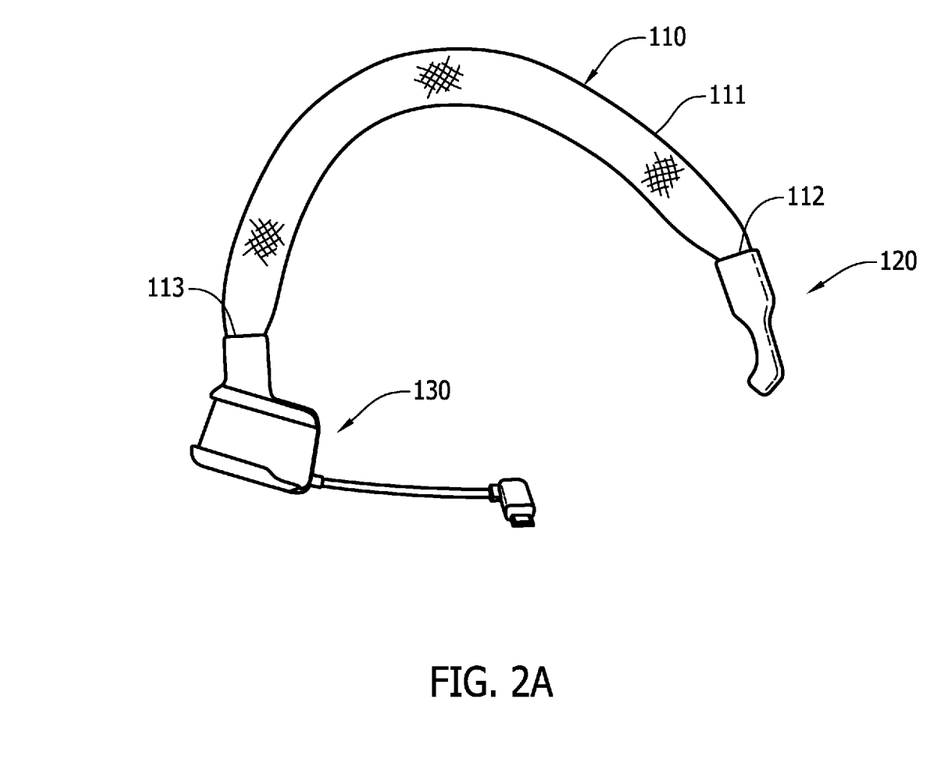
FIG. 2A shows an exemplary embodiment of the accessory for a wearable computer.

As shown in further detail in FIG. 2A, the strap 110 has an outer covering formed of a strong, flexible material. For example, in this embodiment, the strap 110 is made of para-aramid synthetic fibers that are woven into a flexible tube-shaped cover 111. Such fibers are available under the trade name KEVLAR. Of course, the strap material is not limited to the above fibers, but may include other strong and flexible materials as are known in the art. For example, the strap cover 111 may be formed of any material including cotton, plastic, nylon, polyester or even hard plastic or nylon material suitable to protect a power source, such as a battery stored therein. The term flexible is defined to mean sufficiently flexible to conform to the radius or curvatures of a user's neck and head. In one embodiment, the strap if sufficiently flexible to connect to the connectors when the connectors are connected to opposing temples of a glasses frame as worn on a user. In one embodiment, the flexibility of the strap allows for a radius of the strap to be two inches or greater when the strap is formed into a 180 degree arc. Thus, the flexibility of the strap is sufficient to establish distance between each connects of four inches (diameter). In one embodiment, the flexibility of the strap allows for a radius of the strap to be three inches or greater when the strap is formed into a 180 degree arc. Thus, the flexibility of the strap is sufficient to establish distance between each connects of six inches (diameter). In one embodiment, the flexibility of the strap allows for a radius of the strap to be four inches or greater when the strap is formed into a 180 degree arc. Thus, the flexibility of the strap is sufficient to establish distance between each connects of eight inches (diameter). In one embodiment, the flexibility of the strap allows for a radius of the strap to be six inches or greater when the strap is formed into a 180 degree arc. Thus, the flexibility of the strap is sufficient to establish distance between each connects of twelve inches (diameter).

The ends of the cover 111 connected to the first connector 120 and the second connector 130, respectively. Specifically, a first end of the cover 111 is connected to the first connector 120 at a first connection 112, and a second end of the cover 111 is connected to the second connector 130 at a second connection 113.

In this embodiment, the connections 112 and 113 permanently connect the cover 111 to the first connector 120 and the second connector 130. Such a connection may be accomplished by mechanical fastening, an adhesive, or other similar connections.

Alternatively, in one embodiment, the connections 112 and 113 may be configured such that the cover 111 is removably connectable to the first connector 120 and the second connector 130. In one configuration the cover 111 may be removed such as for cleaning or replacement for a different color cover, themed cover, or to replace a worn cover. It is further contemplated that the strap cover and the internal power sources may both realeasably connect, both mechanically and electrically, to one or more of the connectors. For example, when the strap 111 is removably connectable to the first connector 120 and the second connector 130, the strap 110, the first connector 120, and the second connector 130 of the accessory 100 may be interchangeable or individually replaceable. This allows the strap including the batteries to be replaced such as in the event that a battery cell fails, or the entire battery system needs replacing, without need to replace the entire unit. Likewise, if a connector 120, 130 breaks or the electronics housed therein fail, only the one connector may be replaced.

Figure 2B:
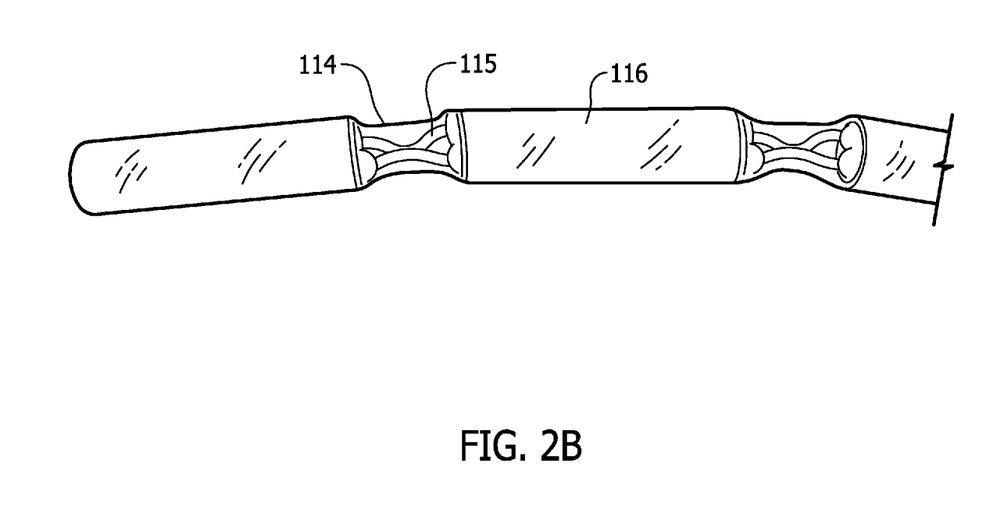
FIG. 2B shows an exemplary embodiment of a power source for the accessory for a wearable computer.

FIG. 2B shows a view of the strap 110 with the cover 111 removed to expose the inside of the strap 110. Arranged inside of the strap 110 is one or more batteries 116 or other power source, configured to store electrical energy. In one embodiment, the batteries 116 are electrically connected to one another via wiring 115, such as in a parallel or serial configuration, or both, to establish a power source with a larger capacity. In this embodiment, the plurality of batteries 116 and wiring 115 are surrounded by a flexible tubing 114, while in other embodiments the cover 114 may be ridge with defined flex points or hinges or may be a shape other than a tube. The batteries 116, wiring 115, and tubing are disposed within the cover 111 of the strap 110.

The batteries 116 in the present embodiment are rechargeable lithium-ion batteries. However, other rechargeable batteries may also be used such as nickel cadmium, nickel metal hydride, and lithium ion polymer, for example. Further, the batteries 116 may be primary cell, non-rechargeable batteries such as alkaline batteries. It is also contemplated that the batteries 116 may be made from or include graphene, or a graphene flexible cloth either as the cover of the batteries themselves may be used in the system. For example, graphene may be used to create a thin, lightweight, and flexible battery. In one embodiment, metal current collectors, conducting additives, or binders are avoided. Graphene based batteries enable rapid electron and ion transport and enable a thin, lightweight, and flexible battery (which may include lithium ion technology) with a high-rate performance and energy density that can be repeatedly bent without structural failure and performance loss.

As stated above, the batteries 116 are electrically connected to one another by wiring 115. The wiring 115 may be any suitable, flexible wiring that allows relative angular movement between adjacent batteries. Thus, the wiring 115 serves as flexible joints between the batteries 116 to allow for overall flexibility of the strap 110. Examples of suitable wiring 115 may include, but are not limited to, single insulated metal stranded wires, wire ribbons, wire cables, or any other wiring or charge connectors.

The present invention is not limited to a specific number of batteries. It will be appreciated, however, that in order for the strap 110 to maintain sufficient flexibility to be worn around the back of the head or neck of user, the number and arrangement of the batteries 116 with wiring 115 in between the batteries should be sufficient so as to allow the strap 110 to maintain flexibility.

In operation, the wiring 115 connects the batteries 116 in a suitable manner so as to provide electrical power to the wearable computer 200, which will be described in more detail below.

The tubing 114 provides protection to the batteries 116 and the wiring 115. The tubing 114 may be comprised of, for example, a shrink wrap made of a heat shrinkable material. The tubing 114 has a thickness and strength that maintains the flexibility of the strap 110 between the batteries 116.

In operation, the strap 110, the first connector 120, and the second connector 130 are removably connected to the wearable computer, such as glasses with integrated electronics, or face worn frames with integrated electronics. The strap 110 includes the cover 111 which protects the batteries 116 and provides an attractive outer appearance. The batteries 116 provide electrical power to the wearable computer 210. The strap 110 further comfortably wraps around the back of the user's head or neck and prevents the wearable computer 200 from falling off of the user. This also balances and distributes the weight of the batteries at a location other than the ears and nose.

Figure 3:
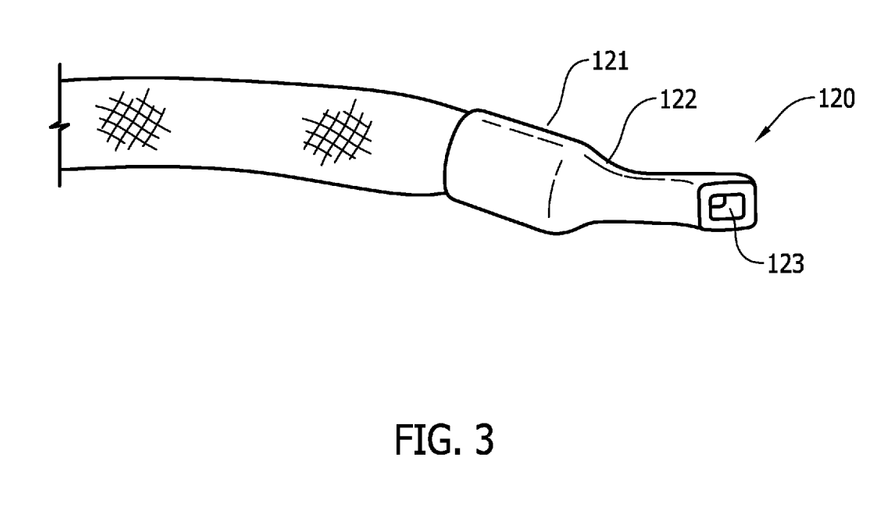
FIG. 3 shows a close up perspective view of a first connector of the accessory for a wearable computer according to an exemplary embodiment.

A detailed view of the first connector 120 is shown in FIG. 3. The first connector includes a housing 121. The housing 121 is formed to include a first temple connector 123 and a first strap connector 122. In the present embodiment, the first temple connector 123 is formed as a through hole in the housing 121. The first temple connector 123 is configured to receive one of the temples 220 of the glasses of the wearable computer 200 in order to provide a secure and removable connection thereto. The dimensions of the first temple connector 123 are not particularly limited, but may be set such that in operation, relative movement between the temple 220 and the first temple connector 123 is inhibited by a predetermined frictional force. Accordingly, the first temple connector 123 may provide a secure, removable connection to the temple 220 of the wearable computer.

Alternatively the first temple connector 123 may have a locking mechanism such as a protrusion or recess on an inner surface of the through hole that corresponds to a recess or protrusion located on the temple 220 of the wearable computer 200. Of course, other connections may be employed by the first temple connector 120 to removably connect the first connector 120 to the temple 220 of the wearable computer 200 without departing from the scope of the invention. Such connectors may include, but are not limited to, spring clamps or clips, elastic connections, fasteners, adhesives, or any other connector or fastener.

The first extending portion 122 is configured to extend obliquely away from the first temple connector 123. That is, the first extending portion extends at an angle between 0 degrees and 90 degrees with respect to an axis defined by a back portion of the temple 220 (which may or may not extend through the connector) of the wearable computer 200 and the strap connector. This establishes Angle A as greater than 90 degrees. With the first extending portion 122 extending obliquely from the first temple connector 123, the housing 121 of the first connector 120 may connect with the strap 110 in such a manner to facilitate the strap 110 resting comfortably along the back of the user's head and/or neck.

In operation, the first strap connector 121 removably and securely connects the strap 110 to the temple 220 of the wearable computer 200 via the first temple connector 123. Additionally, the first connector 120 facilitates the comfort of the strap 110 on a user by the first strap connector 122 extending obliquely backward away from the entry point of the temple end into the first temple connector 123 with respect to an axis defined by the and end of the temple 220 of the wearable computer 200. This establishes Angle A as greater than 90 degrees.

Figure 4B:
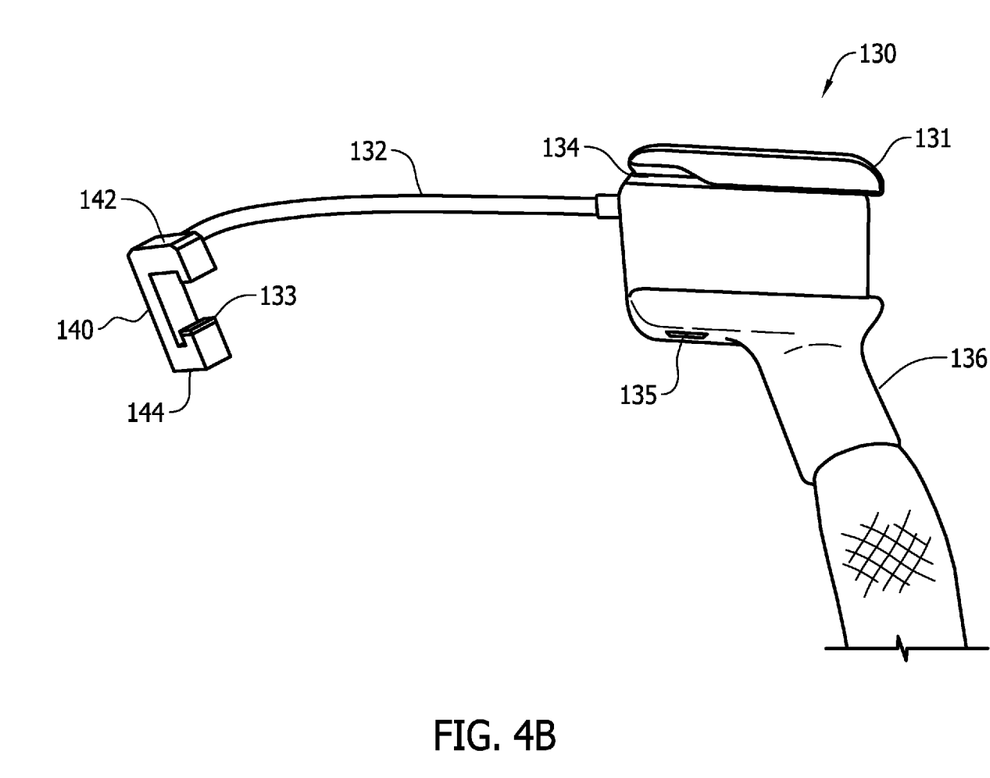
FIG. 4B shows a close up view from a second perspective of a second connector of the accessory for a wearable computer according to an exemplary embodiment.

Detailed views of the second connector 130 are shown in FIGS. 4A and 4B. FIG. 4A shows a close up view from a first perspective of a second connector of the accessory for a wearable computer according to an exemplary embodiment. FIG. 4B shows a close up view from a second perspective of a second connector of the accessory for a wearable computer according to an exemplary embodiment. FIGS. 4A and 4B, being two views of the same part, are discussed unison.

The second connector 130 includes a housing 131 that contains or forms numerous different elements. The second connector 130 is similar to the first connector 120 in that it includes a temple connector and a strap connector 136. The housing also encloses one or more electrical elements. The electrical elements include a controlling, a power port 133, a charging port 135, and a second strap connector 136. The housing 131 is configured to removably and securely connect to the temple 220 of the wearable computer 200 that is not connected to the first connector 120. More specifically in this embodiment, the housing 131 of the second connector 130 is configured to connect to the temple 220 on the side of the glasses to which the computer 210 is mounted and electrically connect to a charging or power supply port of the wearable computer.

In this embodiment, the housing 131 is constructed to form a second temple connector 134. Here, the second temple connector 134 is formed as a C-shaped slot configured to receive an enlarged tip of the temple 220 of the wearable computer 200. For example, the enlarged tip of the temple 220 of the wearable computer 200 could store a battery for the wearable computer 200, but this battery size limits the maximum time of operation for the wearable computer. The second temple connector 134 is formed such that, in operation, relative movement between the second temple connection portion 134 and the temple 220 is inhibited by a predetermined amount of frictional force. Accordingly, the second temple connector 134 may provide a secure, removable connection to the temple 220 of the wearable computer 200 when the temple end is slid into the C-shaped of the second temple connector 134. In other embodiments, shapes other than a C-shaped slot may be used.

Alternatively, the second temple connector 134 may have a locking mechanism such as a protrusion or recess on an inner surface of the C-shaped slot that corresponds to a recess or protrusion located on the temple 220 of the wearable computer 200. Of course, other connections may also be employed by the second temple connector 134 to releasably connect the second connector 130 to the temple 220 of the wearable computer 200 without departing from the scope of the invention. Such connectors may include, but are not limited to, spring clamps or clips, elastic connections, fasteners, adhesives, cinch straps, rubber or silicon tubing, or any other connection type.

The second extending portion 136 is configured to extend obliquely away from the second temple connector 134. That is, the strap connector portion of the connector extends downward at an angle between 0 degrees and 90 degrees with respect to an axis defined by the temple 220 of the wearable computer 200 such that the angle is the angle of the back of the temple piece and the strap connector. This establishes Angle A, located at the front of the connector closer to the nose piece, at greater than 90 degrees. In other embodiments, different angles and physical configuration are contemplated. With the second strap connector 136 extending obliquely from the second temple connector 134, the housing 131 of the second connector 130 may connect with the strap 110 in such a manner to facilitate the strap 110 resting comfortably along the back of the user's head and/or neck. By having the strap connectors extend away from the temple piece at an angle which directs the strap backward, toward the user's back, and not straight down toward the user or forwardly angled toward a user's face or chest, when worn, comfort is improved and fitment of the glass frame is improved. In this proposed configuration the strap rests, when in use, against the back of the user's neck and between the bottom of the ear and the top of the shoulders. This allows the strap to move with the user head and not rub against the user back. This fitment and strap length also secures the glasses frame to the user's head such that if the user looks down, the strap is against the back of the user's neck and also connected to the end of the temples pieces, thereby holding the glasses frames onto the user face. This arrangement also places the weight of the strap and batteries on the back of the user's neck, and not pulling downward on the glasses' frame, which in turn would otherwise leverage the front of the frames off of the user's nose.

Turning now to the electrical components of the second connector 130, provided are several elements which facilitate electrical connection between the batteries 116 and the wearable computer 200. Specifically, the second connector 130 includes a power port 133 such as a plug, that is configured to connect with the port 215 of computer 210 to thereby provide power from the one or more batteries of the device 100 to the wearable computer. The power port 133 may be any suitable electrical coupling according to such standards including, but not limited to, USB, FireWire, Thunderbolt, or any other standard or proprietary port. The electrical coupling mechanism may also be a custom coupling configured to interact with a predetermined connector of a wearable computer. For example, and as shown in FIGS. 4A and 4B, the electrical connector may be held in place by a C shaped snap that includes the port 215 at the bottom and a C shaped part that snaps over the top of the temple 220. The C shaped snap may include an upper section 142 that extends over and around the top of the temple piece. A center section 140 of the C shaped clamp is presented on the side of the temple, when installed, and the lower section 144 wraps around the bottom of the temple piece. The electrical port 133 extends upward from the lower section 144 of the C clamp to electrically connect to an electrical port of the wearable computer.

The power port 133 is connected to the housing via a wire 132 or other suitable extension to facilitate the connection of the port 133 with the port 215 of the wearable computer. In one preferred embodiment, the wire extends outward from near the top of the housing to thereby extend along the top of the temple piece. This insures the wire 132 does not contact or irritate the ear or skull of the user. The wire 132 may then connect to and through the C shaped snap to the electrical port 133. In one embodiment, the providing of electrical power from the power supply device 100 to the wearable computer 200 may occur through inductive coupling. Power is transferred without wires, but instead by electromagnetic field coupling when the wearable computer 200 is physically connected to the device 100. The second connector 130 further encloses an electronic control unit (hereinafter ECU) which controls the charging and discharging of the batteries 116.

Figure 5:
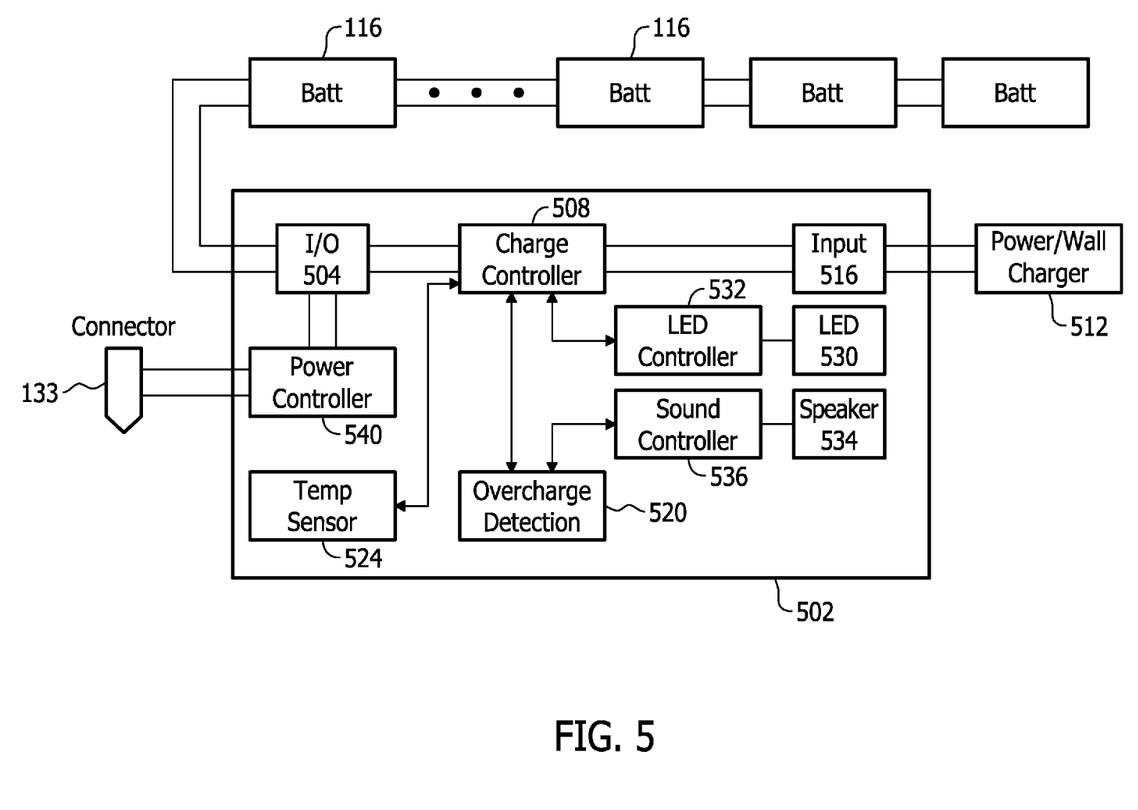
FIG. 5 shows an exemplary block diagram of an exemplary embodiment.

An electrical block diagram of the ECU 502 in conjunction with the batteries 116 is shown in FIG. 5. As shown in FIG. 5, the batteries 116 are connected to an electrical input output port 504 (I/O port) of the ECU. The batteries 116 electrically connect to a charge controller 508. In operation, the electronics of FIG. 5 may be in battery charge mode, power sourcing mode or both.

When in charge mode, the ECU 502 connects to a current source such as a wall plug 512. The wall plug connects to the ECU 502 through an input module 516. The input module 516 connects to the charge controller as shown. The charge controller 508 monitors and controls the charging of the batteries 116. One or more sensors or detectors are provided to ensure proper charging. For example, an overcharge detection unit 520 and a temperature sensor 524 communicatively connect to the charge controller to prevent overheating and/or malfunction of the ECU, and to avoid problems that may affect the batteries 116 or the wearable computer 200. One or more LED light sources 530 or speakers 534 are provided to provide feedback to the user. An LED controller 532 and sound controller 536 are also provided as shown to assist in or enable the operation of the LED 530 and the speaker 534.

The ECU 502 also handles power sourcing functions with the power controller 540. The power controller 540 controls the sourcing of electric power from the batteries 116 to the wearable computer 200 via the wire 132 and power port 133. As shown, the power controller 540 electrically connects to the I/O unit 504 to receive power from the batteries 116. The power controller 540 may also connect to or utilize the functionality of the temperature sensor 524 and the overcharge detection unit 520 to achieve desired operation. The output of the power controller 540 connects to the connector 133. The power controller 540 and the charge controller 508 may be combined into a single element.

In operation, the batteries 116 may be charged from an external power supply when the accessory 100 is connected to an external power supply via the port 135. The charging of the batteries is controlled by the charge controller on the ECU. Further, the overcharge detection unit may stop the charging when an overcharge is detected. Similarly a charging operation may be halted when the temperature sensor detects a temperature that exceeds a predetermined temperature. In one embodiment, the ECU may indicate to a user that a charging operation has been terminated by controlling the LED 137 and/or the speaker. The ECU may also indicate to a user that the charging is complete or that charging is required by controlling the LED and/or the speaker.

When charged, the batteries 116 may provide power to the wearable computer 200 through the power controller 540. The power supplied by the batteries 116 operate to power the computer 210 of the wearable computer 200 or may operate to charge the wearable computer's 200 battery. As the batteries 116 provide power to the wearable computer 200, the ECU may control the LED and/or the speaker to communicate to the user a charge state of the batteries 116 as detected by the charge controller. Additionally, the ECU may control the LED and/or the speaker to communicate a connection status with the wearable computer 200 as detected by the power controller. One or more buttons may be provided on the ECU 502 to accept user input.

The charge controller and power controller may be implemented on the ECU as hardware. Alternatively, the charge controller and power controller may be implemented as software, or a combination of both hardware and software. In this embodiment, the external power supply is a wall charger connected to an AC power source. However, other energy sources may also be possible including solar panels, kinetic energy harvesters, DC power sources, or any other source.

In this embodiment, the accessory 100 includes a strap 110 connected to the temples 220 of glasses of a wearable computer 200. However, the invention is not limited to this environment of use. For example, the strap 110 and first and second connectors 120, 130 could be integrated with or be removably coupled to a hat, headband, or other headwear, or may be made part of a purse, belt, sash, clothing, or any other flexible apparatus which is in proximity to a wearable electronic device.

It is also possible that the strap 110 can additionally or alternatively include other energy sources such as solar panels or kinetic energy harvesters. For example, movement of the user body or head may operate to charge the batteries and the outer strap cover may be made of solar cells that charge the batteries. The strap 110 may also be configured to be buoyant and waterproof such that the strap portion and wearable computer float in water or are waterproof.

Figure 6:
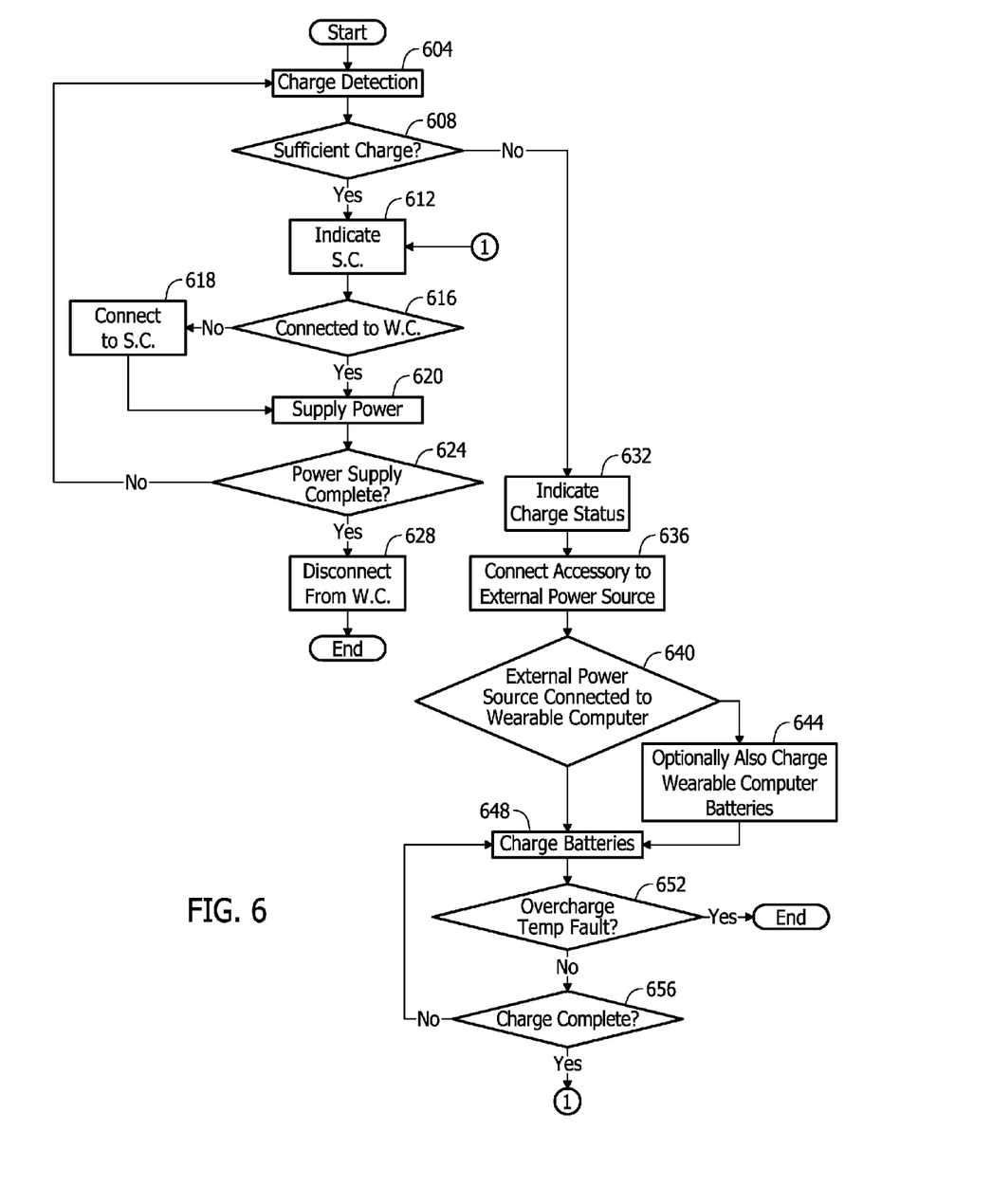
FIG. 6 outlines a process for powering a wearable computer according to an exemplary embodiment.

An exemplary process for powering a wearable computer will now be described with reference to FIG. 6. At a step 604, a charge state of the batteries is determined by the charge controller. The process then advances to a step 608. At step 608, the charge controller determines whether the state of charge of the batteries is sufficient to power the wearable computer or if additional charge may be placed in the batteries. If it is determined that there is not sufficient charge, then the process proceeds to a step 632, which is discussed below. However, if the charge controller determines that there is sufficient charge, the process advances to a step 612.

At step 612, the electronic control unit controls the LED and/or the speaker to indicate to a user that there is sufficient charge in the batteries to power the wearable computer. This allows the user to determine state of charge and may also indicate an amount or percentage of charge in the batteries. This may be done with a display on the connector, an audible tone, or visual flashes or color of the LED light source.

At a step 616, the power controller determines if the accessory is connected to the wearable computer. If the accessory is not connected to the wearable computer, the process proceeds to a step 618 and waits until the accessory is connected with the wearable computer. The process then proceeds to a step 620. If the accessory is connected to the wearable computer in step 616, then the process advances directly to step 620.

At step 620, the power controller controls the supply of electricity from the batteries to the wearable computer. This step achieves supplying power from the batteries to the wearable computer. At a step 624, it is determined whether the supplying of power is complete. If the power supplying is not complete, the process returns to step 604, but if the power supplying is complete, the process advances to a step 628, such that the accessory is disconnected from the wearable computer, after which the process ends.

The user may also wear the wearable computer with the power supplying accessory attached. As such, the accessory is attached to the wearable computer and, in the case of a glasses frame based wearable computer, the user rests the nose pieces on their nose and the temples are supported by the user's ears. The connectors attached to or near the ends of the temples and the strap extends behind and around the user's neck. The provisional patent applications to which this application claims Returning to step 608, when the charge controller determines that there is insufficient charge, the process proceeds to step 632. At step 632, the electronic control unit indicates to a user that the charge status of the batteries is insufficient to power to the wearable computer or that the charge status is low.

The process then advances to a step 636. At step 636 the process waits until the user connects the accessory to the external power via the charging port. The charging port and power supply port may be a single port.

Next, at a step 640, the power controller determines whether the accessory is connected to the wearable computer. If the accessory is connected to the wearable computer, the process advances to 644. At step 644, the power controller controls the electronic control unit such that power is optionally supplied from the batteries to the wearable computer to charge the wearable computer batteries. The batteries may also supply power when charging to enable powered use of the wearable computer.

At a step 648, the power controller further controls the flow of electricity from the external power supply to the wearable computer. Thus, the charge controller controls a charging operation of the batteries and charges the batteries from the power supplied from the external power supply.

At a step 652, an overcharge detection unit and the temperature sensor monitor the conditions in the electronic control module and the batteries. If an overcharge is detected or the temperature is above a predetermined temperature, the process ends until the fault is corrected. If no overcharge or excessive temperature is detected, the process advances to step 656.

In step 656, the charge controller determines whether the charging is complete. If the charging is not complete, the process returns to 648. If the charging is complete, the process proceeds to 612, and continues as explained above.

In one or more other embodiment, various additional features may be presented. In one embodiment the system is configured to perform Simultaneous charging, which refers to an ability to charge both the wearable computer battery and the strap portion battery simultaneously. This may be accomplished by connecting the strap portion battery to the wearable computer, and connecting the strap portion battery to a power source, such as a wall outlet. Accordingly, the strap portion may include power management circuits that enable power to be selectably distributed to the wearable computer and charge the one or more batteries.

The strap portion may have differently sized and/or shaped ends or end connectors to accommodate the specific size and geometry of the wearable computer. For example, one end of the strap portion may be sized such that it is removably coupled with a battery compartment of the wearable computer.

In some embodiments, the strap portion may include add-on accessories for the wearable computer. For example, the strap portion may include a memory storage device usable by the wearable computer. The memory may be located in the housing or in the strap, or both. It can be accessible through the port or connector 133, or via a separate electrical connection. It is contemplated that it could also be accessed wirelessly using a wireless transceiver connected to an antenna.

The wearable computer may use the memory storage device as additional storage for data, files, videos, recordings, software, or any other content. The memory storage device may include software that may be executed by the wearable computer. The memory storage device may be removable, such as a micro-SD card. The add-on accessories may be coupled with the wearable computer using the same or different link as the battery in the strap portion. For example, a single USB connection may be used to provide the wearable computer with power and a connection to the add-on accessories. Other add-on accessories may include any USB-based accessory, and may include input and output devices include HID devices, sensors, video outputs, audio outputs, or any other accessory.

In some embodiments, the accessory for a wearable computer includes a power source, such as batteries or solar panels, integrated in a strap that is coupled to goggles, such as snowboard or motocross goggles. The goggles strap may be similar to, and have similar features and functionality to, the strap portion described herein. For example, a pair of snowboard goggles may have a strap portion that includes a battery that connects to a wearable computer that is integrated with the goggles and/or separate from the goggles. A snowboarder may be wearing goggles and a wearable computer, for instance. Other accessories, such as USB devices, may be integrated with the strap portion, as described herein.

Similarly, batteries for a wearable computer may be integrated into a helmet or other headgear. The wearable computer may be integrated with and/or separate from the helmet.

In some embodiments, external batteries, such as those described herein, may increase the run time of a wearable computer. For example, the battery in the strap portion may triple the effective battery life of the wearable computer. In some embodiments, the battery in the strap portion includes 4 "AAA" sized batteries. Such batteries may be placed end-to-end such that the batteries may be inserted into an opening in the strap portion. The batteries may be viewable as bulges in the strap portion or the strap side view may not reveal the battery locations.

In one embodiment the batteries may be permanently installed in the strap, or may be removable and replaced with either rechargeable or non-rechargable batteries. In this way, multiple different batteries could be swapped into and out of the strap portion while other battery sets are charging. If configured to accept replaceable batteries, the batteries may snap into predefined batteries holders, one or more of which are attached to another predefined battery holder by a flexible electrical connection and an optional flexible mechanical connection. These flexible connections maintain flexability to the strap. Batteries holders having a predefined battery slot which accept charged batteries are known in the art and not described in detail.

It is also contemplated that the batteries and connection not be flexible, but instead could be ridge. While likely not as comfortable or adaptable to the user, a ridged design provides the benefit of lower manufacturing costs or greater lifespan. Some application may benefit from a ridged design, or a design which has one or more moveable joints which may move or flex and be optionally locked down into place.

In some embodiments, a power source is removably coupled with the wearable computer. The power source may be coupled with the strap portion that is coupled with the wearable computer. The power source may be housed in an enclosure, and the enclosure may include a clip or other fastener for removably coupling the power source to belts, pockets, hats, etc. For example, a secondary wire may extend from the strap, connector or housing of the accessory and extend to a separate element or compartment which stores one or more additional batteries or other electronics. In this configuration, additional power may be supplied to the wearable computer. In one embodiment, the secondary wire extends from the strap to the separate compartment from a generally central location of the strap to distribute weight evenly on the user and the frame of the glasses. In other embodiment the secondary wire may extend from other locations. It is contemplated that the secondary wire may optionally contain batteries or a power source or power generation element.

It will be understood that the above described arrangements of the apparatus and method are merely illustrative of applications of the principles of this invention and many other embodiments and modifications may be made without departing from the spirit and scope of the invention as defined in the claims. The features and elements may be combined in any known manner or combination, either alone, or in combination to develop new embodiments.

What is claimed is:

1. An accessory for a wearable computer comprising: a flexible strap having an inner volume, the flexible strap having a first strap end and a second strap end; one or more batteries that are electrically connected and contained within the inner volume of the flexible strap; a first connector attached to the first strap end and having a first wearable computer connector, the first wearable computer connector configured to releasably connect to a wearable computer; and a second connector attached to the second strap end, the second connector including: a second wearable computer connector configured to releasably connect to the wearable computer; a housing formed as part of the second connector and the second wearable computer an electronic control unit contained within the housing, the electronic control unit in electrical communication with the one or more batteries and having one or more ports configured to electrically connect to the wearable computer to provide power to the wearable computer and electrically connect to a power source for charging of the one or more batteries.

2. The accessory for a wearable computer according to claim 1, wherein:

the wearable computer is implemented on a glasses frame which is supported by a user's face, and the first and second connectors connect the first and second ends of the strap to temples of the frame of the glasses.

3. The accessory for a wearable computer according to claim 2, wherein:

the first connector and the second connector each include an extending portion that connects to the first end of the strap and second end of the strap, respectively, and the extending portions extend obliquely with respect to an axis defined by the temples of the pair of glasses, such that an angle formed by temples of the frame and the extending portion is greater than ninety degrees.

4. The accessory for a wearable computer according to claim 2, wherein the first and second connectors are configured to receive ends of the temples such that when the first and second connectors are connected to the temples, relative movement between the first and second connectors and the temples is inhibited.

5. The accessory for a wearable computer according to claim 1, further comprising:

wiring configured to electrically connect each of one or more of batteries to an adjacent battery, the wiring being flexible so as to allow relative angular movement between adjacent batteries to enable flexability of the strap, and flexible shrink wrap surrounding the plurality of batteries and wiring.

6. The accessory for a wearable computer according to claim 1, wherein the strap comprises woven Kevlar fibers.

7. The accessory for a wearable computer according to claim 1, wherein the strap is releasably connected to the first and second connectors.

8. The accessory for a wearable computer according to claim 1, wherein the second connector includes a charging port that is electrically connected to the electronic control unit, the charging port being configured to receive electrical power from an external power supply, and the electronic control unit is configured as a charge controller that controls an amount of electrical power supplied from the external power supply to charge the one or more batteries.

9. The accessory for a wearable computer according to claim 1, wherein the electronic control unit further comprise a temperature sensor and an overcharge detection unit, and the electronic control unit terminates charging of the batteries when the overcharge detection unit detects an overcharge or when the temperature sensor detects a temperature that exceeds a predetermined temperature.

10. An accessory for a wearable computing device comprising:

one or more batteries electrically connected to form a power source, the power source configured to electrically connect to a wearable computing device;

one or more covers covering the one or more batteries, such that the power source covered by the one or more covers is flexible;

one or more connectors physically attached to the one or more covers and further configured to physically and releasably attach to the wearable computing device; and an electrical connector configured to electrically connect the power source to the wearable computing device.

11. The accessory of claim 10, further comprising an electronic control unit having a charging port, the electronic control unit electrically connected to the one or more batteries.

12. The accessory of claim 10, wherein the wearable computing device for use with the accessory is a data transceiver with a projection device mounted to a glasses frame.

13. The accessory of claim 12, wherein the one or more covers is one strap having a length that when worn by a user, extends across the back of the user's neck and extends downward to a position between a bottom of the user's earlobes and a top of the user's shoulders.

14. The accessory of claim 10, wherein the one or more batteries comprise three lithium ion batteries electrically connected with wires, and the one or more covers comprises an inner cover and an outer cover.

15. The accessory of claim 10, wherein the one or more connectors releasably attach to the one or more straps to allow replacement of the one or more straps.

16. A method of powering a wearable computer with an accessory for a wearable computer, the method comprising the steps of:

providing a strap that includes a cover having one or more of batteries within the strap;

joining a first end of the strap to a first end of the wearable computer via a first connector;

joining a second end of the strap to a second end of the wearable computer via a second connector;

electrically connecting the one or more batteries to the wearable computer via an an electrical connection;

wearing the wearable computer, and supplying electric power to the wearable computer from the one or more batteries when wearing the wearable computer.

17. The method of claim 16, wherein the wearable computer is a glasses frame with an image display device.

18. The method of claim 16, further comprising charging the one or more batteries and one or more batteries inside the wearable computer by connecting a plug-in wall charger to a charging port associated with a charge controller that is in electrical communication with the one or more batteries.

* * * * *